United States Patent [19]
Obermeier et al.

[11] Patent Number: 5,233,875
[45] Date of Patent: Aug. 10, 1993

[54] STABLE CAPACITIVE PRESSURE TRANSDUCER SYSTEM

[75] Inventors: Horst Obermeier, Huellhorst, Fed. Rep. of Germany; Saleh U. Ahmed, Northridge, Calif.

[73] Assignee: Kavlico Corporation, Moorpark, Calif.

[21] Appl. No.: 878,040

[22] Filed: May 4, 1992

[51] Int. Cl.$^5$ .................................................. G01L 9/12
[52] U.S. Cl. ...................................... 73/718; 73/724; 361/283
[58] Field of Search .......................... 73/708, 718, 724; 361/283; 29/25.41

[56] References Cited

U.S. PATENT DOCUMENTS

| | | |
|---|---|---|
| 4,272,822 | 6/1981 | Yasuhara et al. ............ 73/718 |
| 4,398,426 | 8/1983 | Park et al. ..................... 73/724 |
| 4,425,799 | 1/1984 | Park .............................. 73/718 |
| 4,644,798 | 2/1987 | Tamura et al. ............... 73/708 |
| 4,735,098 | 4/1988 | Kavli et al. ................... 73/718 |
| 4,741,214 | 5/1988 | Vidmantas .................... 73/708 |

Primary Examiner—Donald O. Woodiel
Attorney, Agent, or Firm—Poms, Smith, Lande & Rose

[57] ABSTRACT

A stable pressure transducer system is disclosed. The transducer system includes a variable capacitor having conductive plates with one of the conductive plates being associated with a diaphragm variable under pressure changes to vary the capacitance of the variable capacitor. The system also includes a reference capacitor. Circuitry for applying signals to the pressure variable and the fixed reference capacitor is used to obtain outputs from each of the capacitors with the output from the variable capacitor varying in amplitude with its capacitance. Circuitry for differentially combining the outputs from the variable and fixed capacitors provides an output voltage indicating the pressure applied to the diaphragm. In order to stabilize the output of the transducer, an isolating capacitor having a capacitance value at least several times greater than the capacitance of the variable and reference capacitors is coupled in series with one or both of the variable and reference capacitors. Preferably two isolation capacitors are used, one in series with each of said variable and reference capacitors on either side thereof. However, in some cases a single isolating capacitor between a common output point of the variable and fixed capacitors and ground may be effective.

20 Claims, 4 Drawing Sheets

STABLE CAPACITIVE PRESSURE TRANSDUCER SYSTEM

Field of Invention

This invention relates to pressure transducer systems wherein the capacitance between metal plates associated with a diaphragm are shifted in their position as pressure is applied to the diaphragm, and the resultant change in capacitance produces changes in an output signal.

BACKGROUND OF INVENTION

Capacitive pressure transducer systems of the type described in the preceding paragraph are generally known in the prior art; and prior art transducers of this type are disclosed in U.S. Pat. No. 4,735,098, granted Apr. 5, 1988, to inventors Fred Kavli and Kyong Park; and U.S. Pat. No. 4,425,797, granted Jan. 17, 1984 to inventor Kyong Park, with both patents being assigned to Kavlico Corporation, the assignee of the present invention.

In pressure measurement systems using transducers of this general type, normal performance checks have occasionally indicated incorrect output results. In one known system, a square wave is applied to a first circuit including a fixed reference capacitor and to a second circuit including a pressure variable capacitor which may be the conductive plates associated with a pressure responsive diaphragm. The output from each of the first and the second circuit varies with the value of the capacitance, and the difference between the two outputs is measured to indicate the level of the pressure applied across the diaphragm. In the cases where the normal performance checks indicated incorrect voltage versus pressure outputs, in some cases a very low output reading was observed at all times indicating zero input pressure despite high applied pressure levels, and in other cases the output voltage would drift up or down, indicating high or low pressure regardless of the actual applied pressure.

A principal object of the invention is to provide a more stable pressure transducer system which is not subject to the problems outlined above despite adverse conditions.

SUMMARY OF THE INVENTION

In accordance with one aspect of the present invention, it was determined that the cause of the problem was an effective relatively high leakage resistance across either the fixed reference capacitor or the pressure responsive variable capacitor, or both. This leakage resistance may be due to a slight contamination of the fluid within some of the pressure transducers, or may be due to a variety of other reasons.

In accordance with the present invention, it has been determined that the inclusion of a capacitance in series with the pressure variable or the fixed reference capacitor or both, effectively solved the problem; and with this change, pressure transducer units which had initially given incorrect output voltage versus pressure readings now operated accurately.

More specifically, it was determined that certain pressure transducer units of the general type shown in the patents cited above may be positively stabilized by the addition of a capacitance in series with each of the pressure variable capacitor and the fixed reference capacitor. With the capacitance of both the reference capacitor and the (unflexed) variable capacitor being in the order of perhaps 30 to 70 picofarads ($10^{-12}$ farads), depending on the size and application of the transducer, it is desirable that the series capacitances be several times greater, or at least 200 picofarads (pf), and preferably a few thousand pf.

In accordance with a specific illustrative embodiment of the invention, therefore, a stable pressure transducer system includes a variable capacitor including conductive plates, with one of the conductive plates being associated with a diaphragm variable under pressure changes to vary the capacitance of the variable capacitor; and a reference capacitor; circuitry for applying signals to the pressure variable and the fixed reference capacitor to obtain outputs from each of them with the output from said variable capacitor varying in amplitude with its capacitance; and circuitry for differentially combining the outputs from the variable and fixed capacitors to provide an output voltage indicating the pressure applied to the diaphragm; and at least one isolating capacitor having a magnitude of at least several times greater than the capacitance of said variable and said reference capacitor, in series with said variable or said reference capacitor. Preferably two isolation capacitors are used, one in series with each of said variable and reference capacitors on either side thereof. However, in some cases a single isolating capacitor between a common output point of said variable and fixed capacitors and ground may be effective.

These and other objects of the present invention will now become apparent from a review of the drawings and the following description of the preferred embodiments.

DETAILED DESCRIPTION

Figure 1:
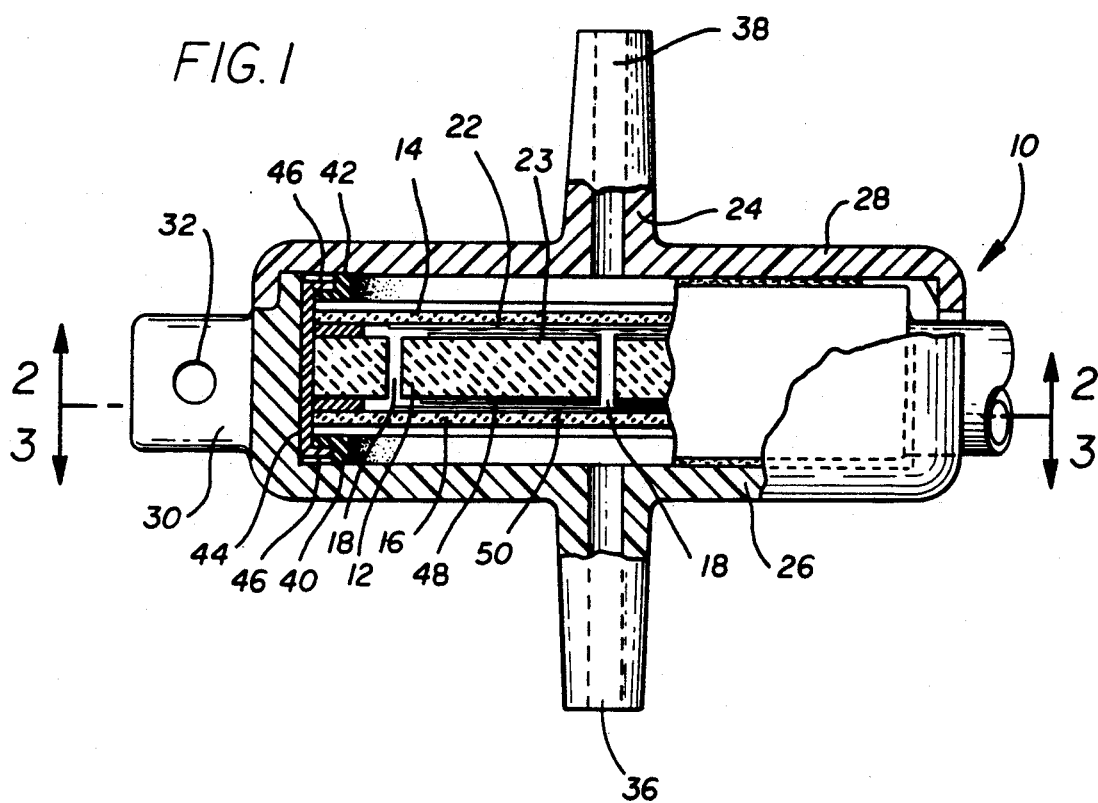
FIG. 1 is a partial cross-sectional view of a capacitive transducer of the type to which the principles of this invention are applicable.

Referring now to FIG. 1, a capacitive transducer 10 of the present invention is shown. The capacitive transducer 10 includes central base plate 12 and two diaphragms 14, 16. The diaphragms 14, 16 are mounted on either side of the base plate 12, with each of the diaphragms being in a spaced relationship with the plate 12.

The base plate 12 and diaphragms 14, 16 are preferably formed of an insulating material having substantially zero mechanical hysteresis, for example, a quartz, alumina, ceramic, or glass such as Pyrex material with alumina being preferred. The diaphragms 14, 16 are mounted to the base plate 12 in the spaced apart relationship by glass frit or an adhesive material. The spaced areas between the diaphragms 14, 16 and the base plate 12 are preferably filled with an insulating low viscosity fluid, such as silicone oil.

The base plate 12 has at least one and preferably several openings 18, through which the silicone oil flows to effectively couple the diaphragms 14, 16 so that they deflect together to indicate the differential pressure applied to the two diaphragms.

In order to form the capacitive elements of the transducer, thin layers of conductive material 22, 23 are applied to the facing surfaces of the central plate 12 and the diaphragm 14. The facing surfaces of the base plate 12 and diaphragm 16 are also provided with corresponding conductive surfaces 48, 50. The thin layers of conductive material are preferably applied by a silk screen process, after which the conductive material is fired in a manner known by those skilled in the art.

It should be noted that the conductive surfaces are very thin, for example less than one-thousandth of an inch thick. The electrical connections to the capacitor plates is made in a manner known by those skilled in the art, and shown in the prior patents cited above. The output of the capacitors is coupled to a printed output circuit, which may be mounted in the base of the housing 24, or mounted separately. The output circuit is described in more detail hereinbelow.

The base plate 12 and diaphragms 14, 16 are enclosed within a preferably plastic housing 24, which includes a base member 26 and a cover member 28. The base member 26 may include a mounting plate 30 having a plurality of openings 32 to receive mounting screws (not shown). The base member 26 further includes a first inlet 36 for fluid pressure from a source. The cover member 28 includes a second inlet 38 for receiving pressure from an outside source. Therefore, the output of the transducer is the difference between the pressures of the gases or liquids applied through the first and second inlets 36, 38.

The transducer includes a first gasket 40 to assure the application of pressure to the diaphragm 16 from the first inlet 36. The gasket 40 is preferably rubber, and formed with an L-shaped cross-section in order to bear against the diaphragm 16 and the inner surface of the housing 24. A second gasket 42 is used to seal between the diaphragm 14 and the cover member 28. The second gasket 42 assures that pressure from the second inlet 38 is applied to the diaphragm 14. The gaskets 40, 42 are held in place in the transducer assembly by a metal housing 44 with inwardly turned edges 46.

In operation, when fluid pressure is applied from the first inlet 36, the two diaphragms 14, 16 move together either toward the first inlet 36 or the second inlet 38 depending on the differential pressure. The intercoupling of the two diaphragms 14, 16 by the low viscosity fluid allows both diaphragms 14, 16 to move together.

Figure 2:
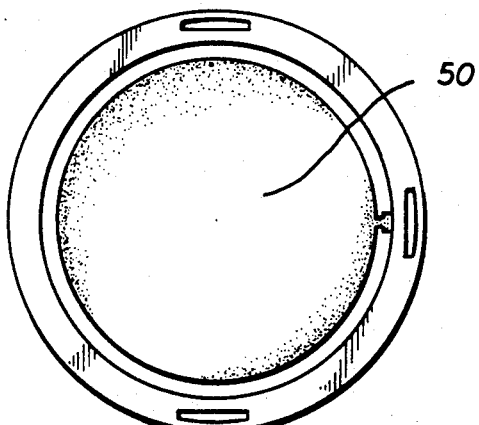
FIG. 2 is a plan view of the diaphragm element of the transducer of FIG. 1.
Figure 3:
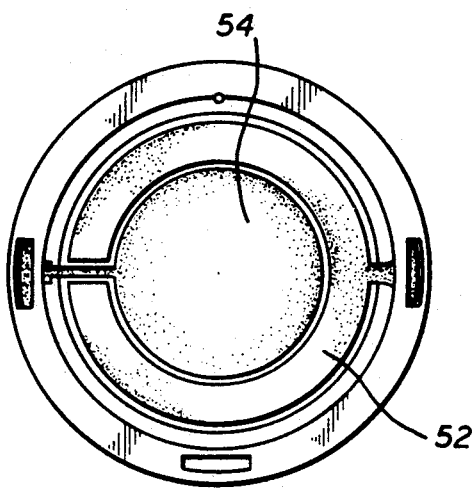
FIG. 3 is a plan view of the inner surface of the thick plate of the transducer of FIG. showing the concentric conductive coatings that form a part of the reference and variable capacitance of the transducer.

Referring now to FIGS. 2 and 3, two views of an electrode configuration of the conductive surfaces 48, 50 are shown. It should be noted that the electrode configuration may vary from one type of transducer to another. The electrode configuration shown causes the capacitance between the electrodes 48 and 50 to increase as the diaphragm 16 moves closer to the base plate 12, and to decrease as the diaphragm 16 moves further from the base plate 12. In FIGS. 2 and 3 the conductive surface 50 is grounded. In FIG. 3, a ring portion 52 near the periphery of the unit constitutes a reference capacitor, and encompasses an active capacitive portion 54 which is variable with pressure. With the reference capacitor 52 being near the periphery of the diaphragm, it shows very little change in capacitance as the diaphragm is flexed, but its location means that changes in temperature, for example, will affect both capacitors similarly.

Figure 4:
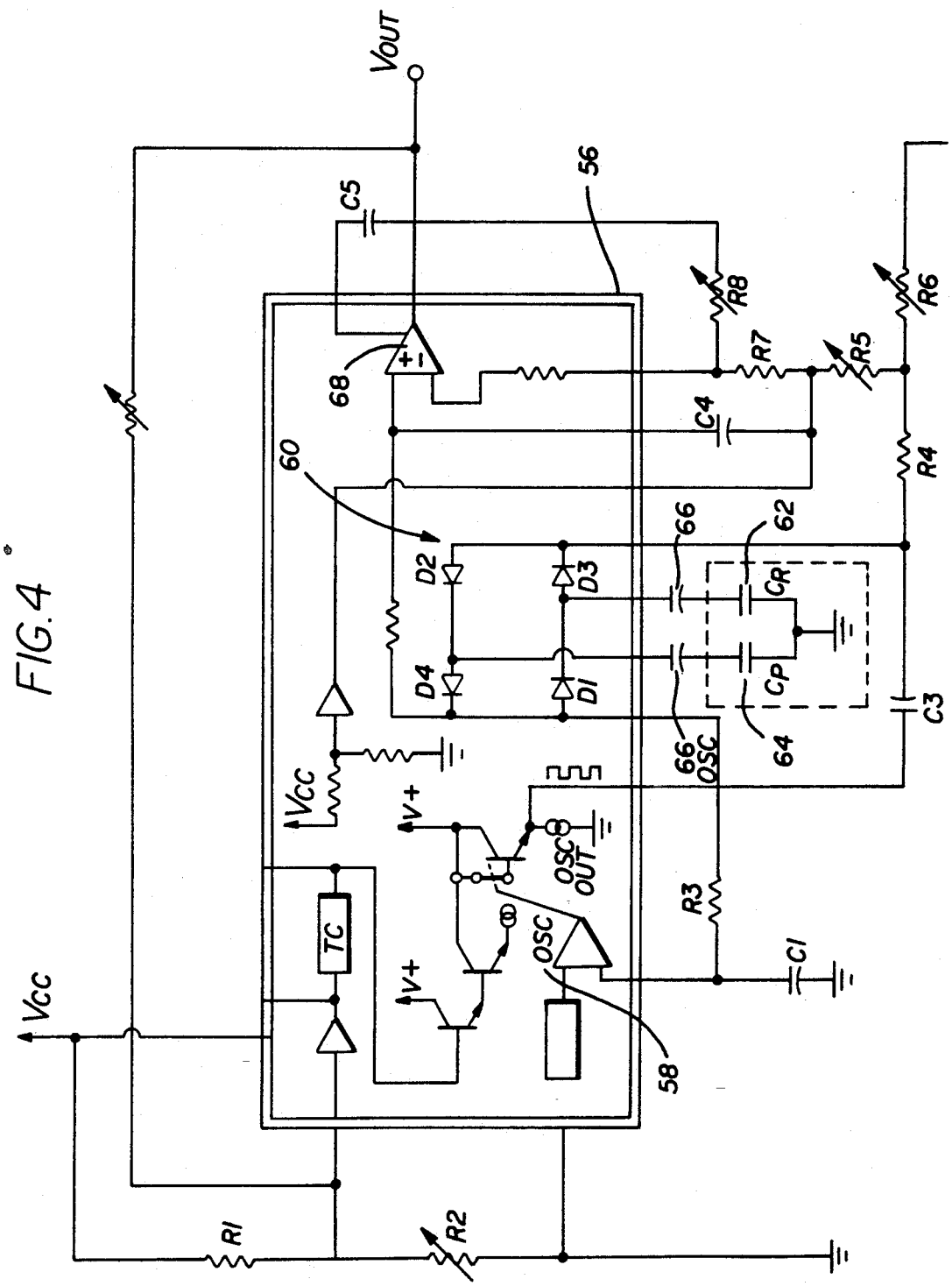
FIG. 4 is a detailed electrical schematic of the stable output circuit of the transducer of FIG. 1.
Figure 5:
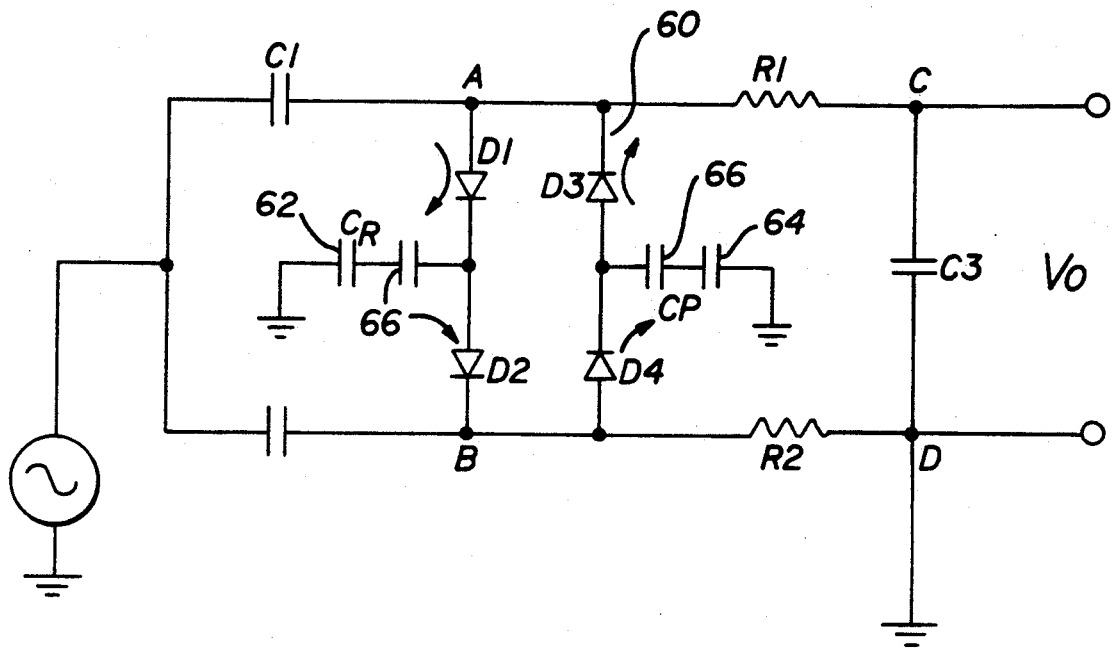
FIG. 5 an electrical schematic of the output measurement circuit.

Referring now to FIGS. 4 and 5, the electrical schematics of a stable output circuit 56 of the transducer are shown. The circuit 56 includes an oscillator 58 for providing the excitation charge, a diode bridge 60, a reference capacitor (Cr) 62, a pressure variable capacitor (Cp) 64, at least one isolating capacitor 66, and various analog elements for measurement and compensation. For purposes of reference, in this embodiment, Cr includes the conductive surfaces 52, 50 of the diaphragm 16. Cp includes the conductive surfaces 54, 50 of the diaphragm 16. Incidentally, the two conductive areas 52, 54 of FIG. 3 are designated by the single reference numeral 48 in FIG. 1.

For exemplary purposes only, the values of the circuit elements in the preferred embodiment are given The oscillator 58 preferably operates at a frequency of approximately 30 to 400 kilohertz. Initially, the values of Cp and Cr are approximately equal, and the values are approximately 20 to 70 pf. During operation of the pressure transducer, the value of Cp may increase approximately from 30 pf to 40 pf for one size transducer and from about 70 pf to about 100 pf for another typical transducer. The value of the reference capacitor Cr may increase from 30 pf to approximately 31 pf for a smaller transducer and from about 70 pf to 74 or 75 pf for a larger size transducer.

In operation, the oscillator 58 provides charges which are transferred to the output measurement circuit, where the charges accumulate. The specific amount of charge transferred from the oscillator 58 is controlled by the capacitors Cp and Cr. The diode bridge 60, comprised of D1, D2, D3, and D4, functions as a switch so as to direct the charges across the output measurement circuit in two separate directions, either across Cp or across Cr.

The application of pressure to the diaphragm 16, which is associated with Cp, causes an increase in the capacitance value of Cp. In turn, any changes in the values of Cp, or Cr, alters the amount of charge across the corresponding path in the output measurement circuit. The measurement circuit accumulates the difference in the charges across the paths, and amplifies the difference so as to obtain a voltage output that corresponds to the differential pressure applied to the transducer.

As previously described in the Summary of the Invention, a problem with the output measurement circuit may be caused by a leakage path across either Cp or Cr. The leakage path allows charge to bleed off, therefore affecting the amount of charge measured in the particular path having the leakage, and causing an error in the output measurement of the circuit. In order to avoid the leakage problem, it has been determined that an additional isolating capacitor, added in series with one of the capacitors Cp or Cr, or both, will serve to block the current path from the corresponding capacitor Cp or Cr to ground. The charge leakage through Cp or Cr is transferred to the isolating capacitor. The two capacitors in series thus act together as a single capacitor, therefore eliminating the leakage problem.

It has also been determined that in order to effectively block the charge leakage, without interfering with the sensitivity of the transducer, the isolating capacitor preferably has a capacitance value several times greater than the capacitance value of the capacitor to which it is coupled in series. For example, if the isolating capacitor is coupled in series with Cp, and Cp has a value of less than approximately 200 picofarads, such as 70 picofarads, then the corresponding isolating capacitor preferably has a value of at least approximately 1000 picofarads.

The substantially greater value of the isolating capacitor allows the isolating capacitor to act as a reservoir of charge for the corresponding variable or reference capacitor. The current through the isolating capacitor is directly related to the capacitance value, while the impedance of the capacitor is the inverse of its capacitance value. Therefore, the large value of the isolating capacitor enables it to store charges for the variable or reference capacitor. However, the large capacitance value creates a small impedance value, and therefore, the isolating capacitor does not add a significant load to the circuit or change the sensitivity of the transducer to any significant extent.

While the isolating capacitors serve to provide additional charge for Cp and Cr, they do not adversely affect the voltage amplitude across Cp and Cr. The voltage amplitude measured across a capacitor is inversely related to the value of the capacitor, as demonstrated by the equation:

$$v = 1/C \int i \, dt$$

As previously noted, the added isolation capacitor is very large in value compared to the value of Cp or Cr. Therefore, the inverse of the value of the isolation capacitor is very small in comparison to the inverse of the value of Cp or Cr. As a result, the isolation capacitor does not significantly affect the voltage amplitude measured across Cp or Cr.

Figure 7:
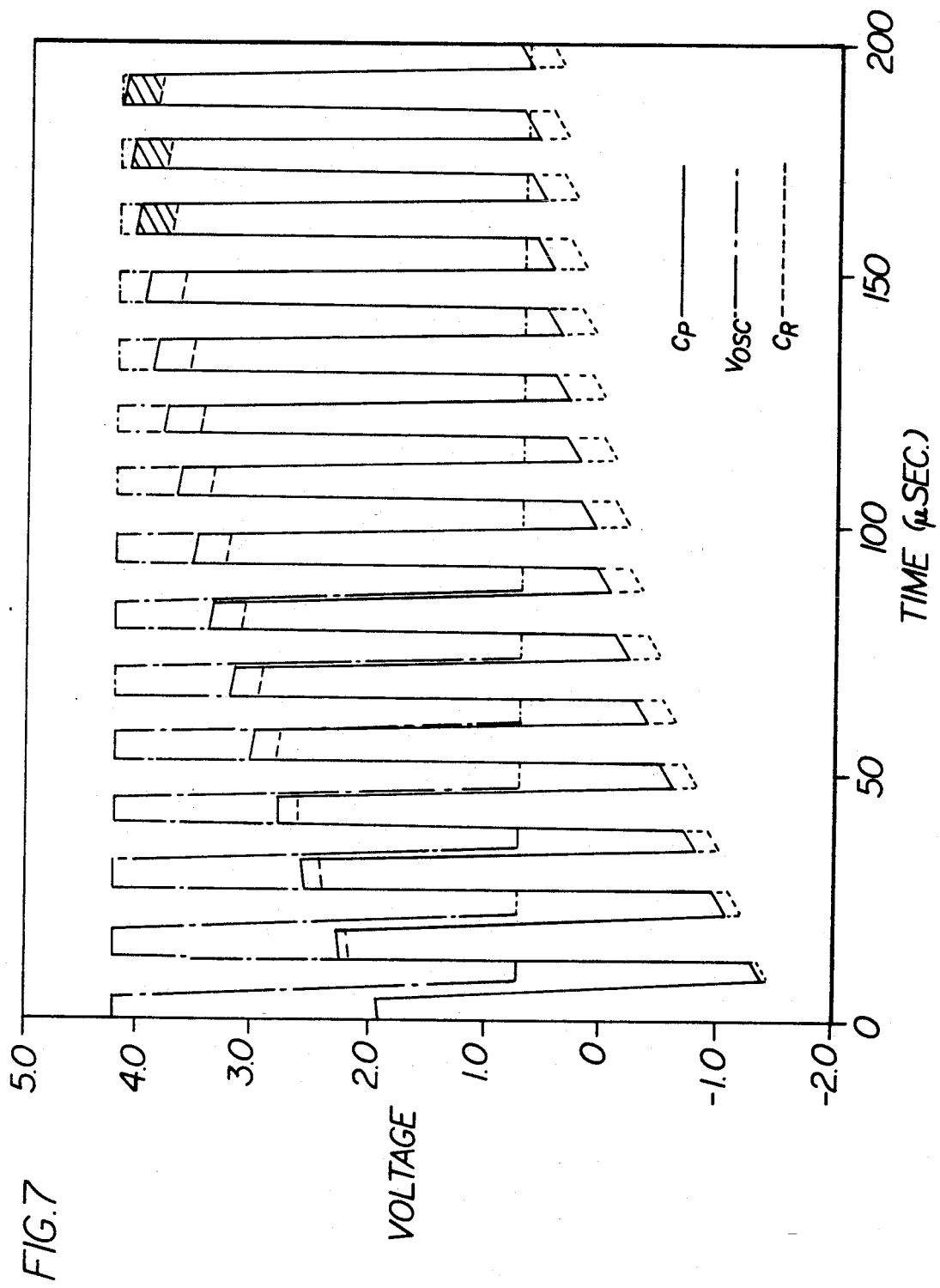
FIG. 7 is a graph of the voltage amplitude corresponding to Cp and Cr shown in square wave form.

Referring now to FIG. 7, a graph of the voltage amplitude over time corresponding to Cp and Cr for the present invention is shown in square wave form, demonstrating that the isolation capacitors do not significantly affect the voltage amplitude derived from Cp and Cr. Incidentally, in FIG. 7, the left hand side of the graph is the warm-up stage, so we will focus attention on the stabilized right hand side of the plot. The graph shows three square waves, wherein Vosc representing the voltage amplitude as measured at point osc on FIG. 4, Cp represents the voltage amplitude across Cp, and Cr represents the voltage amplitude across Cr. As shown in FIG. 7, with the isolating capacitors in the output measurement circuit, the amplitude of Cp and Cr increases over time, and remains relatively stable after approximately 125 microseconds. The isolation capacitors do not adversely affect the square waves. Therefore, it is demonstrated that the addition of the isolating capacitors does not adversely affect the measured voltage amplitude, nor the corresponding transducer output.

For the purposes of FIG. 7, a predetermined pressure was applied across the diaphragm and the resultant output from the capacitors was measured. It may be observed that the positive voltage swings from the variable capacitor Cp exceeds the positive voltage swings from the reference capacitor Cr, as indicated by the cross-hatched areas on the last three square wave patterns. With the output from Cp applied to the positive input of the operational amplifier 68 (See FIG. 4), and the output from Cr applied to the negative input, the output will be the difference, as discussed below.

Testing of the stable transducer output circuit was accomplished using commercially available 4700 pf isolating capacitors. The isolating capacitors had dimensions of approximately 0.070 inches in length, 0.050 inches in width, and 0.040 inches in depth, and therefore were easily accommodated within the transducer package. It should be understood however that theses dimensions are exemplary only, and may vary with various transducer systems and isolation capacitors.

Figure 6:
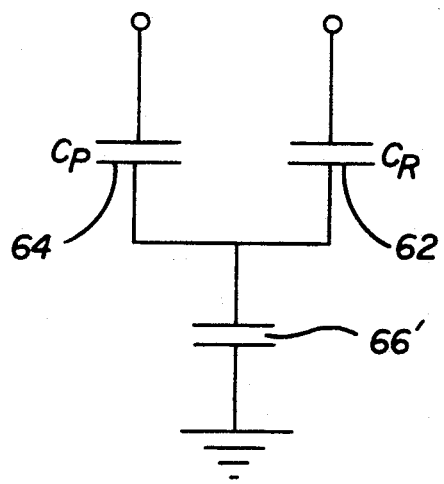
FIG. 6 is a an electrical schematic showing an alternative embodiment of the output measurement circuit.

As best shown in FIG. 5, two isolating capacitors 66 may be utilized, with each of the isolating capacitors 66 being coupled in series to a corresponding one of capacitors Cp and Cr. The isolating capacitor may be coupled on either side of the corresponding one of Cp or Cr, but for convenience, with the broad area conductive plate 50 being common to both capacitors Cp and Cr, it is preferred to have the separate isolating capacitors 66 on the ungrounded side of Cp and Cr. Alternatively, only one isolating capacitor may be utilized, with the one isolating capacitor being coupled in series with one of the capacitors Cp or Cr. FIG. 6 shows another alternative, wherein one isolating capacitor 66' is used, with the isolating capacitor 66' being coupled between the common output of Cp and Cr and ground. In the case of the structure of FIGS. 1-3, the capacitor 66, would be coupled between the common capacitive conductive plate 50 and ground.

Referring now to FIGS. 4 and 5, in the output measurement circuit, the output of an operational amplifier 68 is determined by the following equation:

$$(Cp - Cr)/(Cp + Cr)$$

The equation indicates that as the value of Cp increases with the application of pressure to the transducer, the output of the operational amplifier also increases.

The voltage output of the measurement circuit is determined by the following equation:

$$Vo = (Vp - 2Vd)*(Cp - Cr)/(Cp + Cr)$$

wherein Vp=peak voltage and Vd=voltage drop across the diodes as measured from point A to point B on the circuit of FIG. 5. Therefore, Vo increases in relation to increases in the capacitance of Cp.

It is noted in passing that the transducer of FIG. 1 is shown with two ceramic diaphragms 14 and 16. In practice they may be very thin and spaced from the central thicker alumina member 12 by a relatively small distance, such as 0.0005 inch to 0.020 inch. Also, these diaphragms may be spaced apart from and sealed to the central member 12 around their peripheries in any suitable manner, for example by using glass frit, as disclosed in the prior patents cited above. Further, in place of the upper ceramic diaphragm 14, a membrance type diaphragm, as disclosed in FIG. 9 of U.S. Pat. No. 4,735,098 cited above may be employed. Alternatively, output signals may be obtained from variable and reference capacitors associated with both diaphragms 14 and 16, and the output signals correlated, recognizing that as the capacitance of the variable capacitor associated with one diaphragm increases, that associated with the other diaphragm will decrease.

Having thus described exemplary embodiments of the present invention, it should be noted by those skilled in the art that the within disclosures are exemplary only and that various other alternatives, adaptations and modifications may be made within the scope of the invention. Thus by way of example, but not of limitation, the measurement output circuit may be varied to accommodate a different transducer type. In addition, it may be noted that the additional blocking capacitor or capacitors may be located on the ground side of the reference and the pressure variable capacitor, or on the input side thereof, or both; and that the ground side conductive capacitor plate could be divided, with one section physically opposing the reference capacitor plate and one opposing the pressure variable capacitor plate. Accordingly, it is to be understood that the present invention is not limited to the precise construction as shown in the drawings and described hereinabove.

We claim:

1. A stable capacitive transducer system comprising:
   a transducer structure including a pressure variable capacitor including a diaphragm wherein the capacitance of the variable capacitor changes with the net pressure applied to the two sides of the diaphragm, and a substantially fixed reference capacitor included in said transducer structure so that temperature changes affect both the variable and the reference capacitor in a like manner;
   circuit means for applying signals to said pressure variable and said reference capacitor in such manner that variations in capacitance change the magnitude of said signals;
   circuit means for differentially combining the output signals from said pressure variable and said reference capacitors to provide an output voltage corresponding to the net pressure applied to said diaphragm;
   said pressure variable and said reference capacitors having predetermined levels of capacitance; and
   at least one additional capacitance means in series with at least one of said pressure variable and reference capacitors, said additional capacitance being substantially greater than said predetermined capacitance levels;
   whereby possible transducer instability resulting from high leakage resistance across said variable and/or said reference capacitors is avoided.

2. A stable transducer system as defined in claim 1 wherein said transducer structure includes two conductive members having variable spacing, and a nominally insulating fluid fills the space between said two conductive members.

3. A stable transducer system as defined in claim 1 wherein said additional capacitance means includes two separate capacitors, one in series with said pressure variable capacitor and one in series with said reference capacitor.

4. A stable transistor system as defined in claim 3 wherein said predetermined levels are less than 200 picofarads, and wherein each of said additional capacitors has a capacitance of at least 1,000 picofarads.

5. A stable transducer system as defined in claim 1 wherein one isolating capacitor is used, with the isolating capacitor being coupled between a common output point of the variable and the reference capacitors and ground.

6. A stable capacitive pressure transducer system comprising:
   a variable capacitor that has a capacitance that varies with applied pressure;
   a reference capacitor that has a relatively constant capacitance;
   first circuit means for charging and discharging the variable capacitor and the reference capacitor and for providing variable output signals that vary in relation to the capacitance values;
   second circuit means coupled to the first circuit means for providing an output voltage which varies with the applied pressure; and
   at least one isolating capacitor coupled in series with at least a corresponding one of the variable and the reference capacitors, the isolating capacitor having a value substantially greater than the value of the corresponding variable and reference capacitor, wherein the isolating capacitor serves to avoid instability resulting from possible leakage resistance across the corresponding capacitor, creating a stable transducer output.

7. A stable capacitive pressure transducer system in accordance with claim 6 wherein the value of the isolating capacitor is several times greater than the value of the value of the corresponding capacitor.

8. A stable capacitive pressure transducer system in accordance with claim 6 wherein two isolating capacitors are used, with each of the isolating capacitors being coupled in series with one of the reference and the variable capacitors.

9. A stable capacitive pressure transducer system in accordance with claim 6 wherein one isolating capacitor is used, with the isolating capacitor being coupled between a common output point of the variable and the reference capacitors and ground.

10. A stable capacitive pressure transducer system in accordance with claim 6 wherein the values of the reference and the variable capacitors are less than 200 picofarads, and wherein each of the isolating capacitors has a capacitance of at least 1,000 picofarads.

11. A stable differential capacitive pressure transducer system in accordance with claim 6 wherein said system includes first and second intercoupled diaphragms and means for applying different input pressures to be measured to said respective first and second diaphragms.

12. A stable capacitive pressure transducer system in accordance with claim 11 wherein the transducer system further includes:
   a central insulating base member having at least one opening and two spaced planar surfaces, wherein the first and the second diaphragms are mounted in a spaced apart relationship on either side of the base member; and
   means for interconnecting the first and the second flexible diaphragms through the opening in the base member.

13. A stable capacitive pressure transducer system in accordance with claim 12 wherein a spaced area between the first and second diaphragms and the base member is filled with an insulating, low viscosity fluid.

14. A stable capacitive pressure transducer system in accordance with claim 12 wherein the opening in the base member is filled with an insulating low viscosity fluid.

15. A stable capacitive transducer system comprising:
    a pressure variable capacitor including a diaphragm wherein the capacitance of the variable capacitor changes with the net pressure applied to the two sides of the diaphragm;

a substantially fixed reference capacitor, the reference capacitor being mounted in the transducer system such that temperature changes affect both the variable and the reference capacitor in a like manner;

first circuit means for charging and discharging the variable capacitor and the reference capacitor and for providing output signals that vary in relation to the capacitance values;

second circuit means coupled to the first circuit means for differentially combining the output signals from said pressure variable and said reference capacitors to provide an output voltage corresponding to the net pressure applied to said diaphragm;

a first isolating capacitor coupled in series with the reference capacitor, wherein the value of the first isolating capacitor is substantially greater than the value of the reference capacitor; and a second isolating capacitor coupled in series to the variable capacitor, wherein the value of the second isolating capacitor is substantially greater than the value of the variable capacitor;

whereby possible transducer instability resulting from high leakage resistance across the variable and reference capacitors is avoided.

16. A stable capacitor transducer system in accordance with claim 15 wherein the value of each of the variable and reference capacitors is approximately less than 200 picofarads, and wherein the value of each of the isolating capacitors is approximately at least 1,000 picofarads.

17. A stable differential capacitive pressure transducer system in accordance with claim 15 wherein said system includes first and second intercoupled diaphragms and means for applying different input pressures to be measured to said respective first and second diaphragms.

18. A stable capacitive pressure transducer system in accordance with claim 17 wherein the transducer system further includes:

a central insulating base member having at least one opening and two spaced planar surfaces, wherein the first and the second diaphragms are mounted in a spaced apart relationship on either side of the base member; and means for interconnecting the first and the second flexible diaphragms through the opening in the base member.

19. A stable capacitive pressure transducer system in accordance with claim 18 wherein a spaced area between the first and second diaphragms and the base member is filled with an insulating low viscosity fluid.

20. A stable capacitive pressure transducer system in accordance with claim 18 wherein the opening in the base member is filled with an insulating low viscosity fluid.

* * * * *